Dec. 11, 1951     I. R. WHITEMAN     2,578,275
AIR-FREE LUBRICANT PUMP DISCHARGE SYSTEM
Filed Sept. 30, 1949
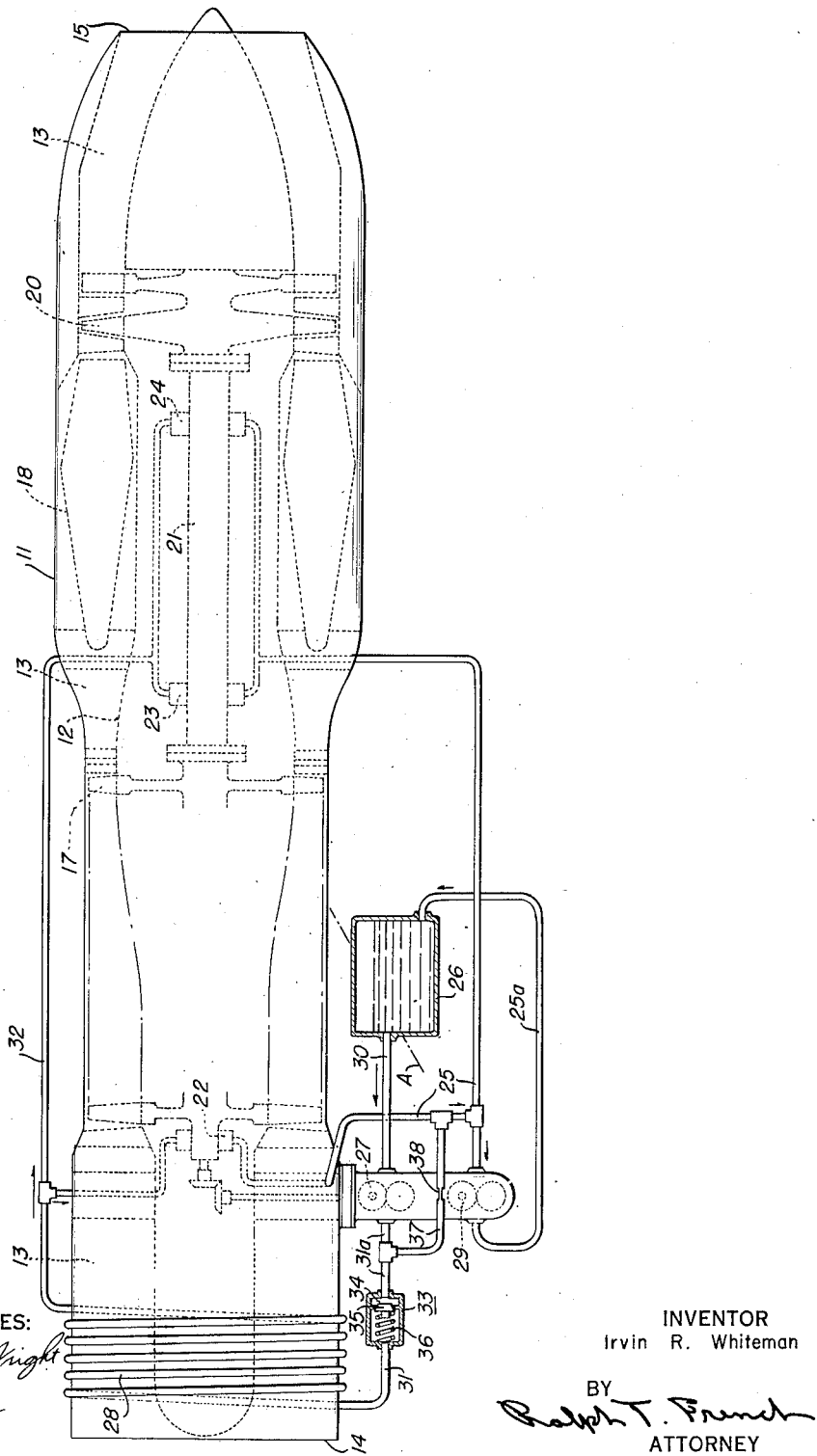
WITNESSES:
John M. Wright
V. W. Novak
INVENTOR
Irvin R. Whiteman
BY
Ralph T. French
ATTORNEY Patented Dec. 11, 1951

2,578,275

UNITED STATES PATENT OFFICE 2,578,275

AIR-FREE LUBRICANT PUMP DISCHARGE SYSTEM

Irvin R. Whiteman, Philadelphia, Pa., assignor, by mesne assignments, to the United States of America as represented by the Secretary of the Navy Application September 30, 1949, Serial No. 118,839

3 Claims. (Cl. 184—6)

This invention relates to pressure lubrication systems, and more particularly to pressure lubrication apparatus for an aviation gas turbine power plant.

In a pressure lubrication system for a gas turbine engine carried on an aircraft, an oil pump of the rotary type, such as a gear pump, is usually employed for delivering oil under pressure from a reservoir to the lubrication system. In some designs of turbojet power plants, oil under pressure from the lubrication system may also be utilized in effecting hydraulic adjustment of engine auxiliaries, such as a movable exhaust nozzle element. To avoid any tendency towarrd erratic performance, it is desirable that such a lubrication or hydraulic system be so devised as to prevent introduction therein of air along with the oil supplied under pressure by the pump, regardless of the position to which the aircraft and engine might be tilted during flight.

A principal object of the invention is the provision of improved means for supplying oil under pressure to a system which will be maintained substantially free of air pockets irrespective of variations in the positioning of the apparatus.

Another object of the invention is to provide an hydraulic pump discharging through a check valve and having a restricted by-pass associated therewith for bleeding off any air inadvertently admitted to the inlet and discharged by the pump, due to tilting of the apparatus or other cause.

These and other objects are effected by the invention as will be apparent from the following description and claims taken in connection with the accompanying drawing, forming a part of this application, in which the single figure is a diagrammatic elevational view of an aviation gas turbine power plant equipped with pressure lubrication means constructed in accordance with the invention.

As shown in the drawing, the power plant therein illustrated in schematic form comprises a substantially tubular outer casing structure 11 having mounted along the axis thereof a sectional inner core structure 12, which with the outer casing defines an annular flow passageway 13 that extends longitudinally through the plant from a forwardly-directed air intake opening 14 to a rearwardly-disposed jet nozzle 15. The casing structure 11 is adapted to be mounted in or on the fuselage or wing of a suitable aircraft (not shown) with the intake opening 14 pointed in the direction of flight. Mounted within the power plant in axial alignment and defining the core structure 12 are an axial-flow compressor 17, combustion apparatus 18, and a turbine 20, which is operatively connected to the compressor through the medium of a shaft 21. The turbo-compressor rotor aggregate thus comprising the turbine 20, the compressor 17 and shaft 21 is rotatably mounted in three bearings 22, 23 and 24 suitably supported within the core structure 12.

In accordance with the well-known principle of operation of a gas turbine engine, air entering the intake opening 14 is compressed by the compressor 17 and delivered through the passageway 13 to the combustion apparatus 18, where fuel, supplied by means of a suitable manifold and nozzles (not shown), is burned to provide motive fluid for driving the turbine 20. Motive fluid exhausted from the turbine 20 is than discharged by way of the nozzle 15 in the form of a jet establishing a propulsive thrust.

For effecting lubrication of operating parts of the engine including the bearings 22, 23 and 24, there may be provided a lubrication system which, as shown in an elementary form, comprises a reservoir 26, an engine driven oil pump 27, a cooler 28, and a scavenging pump 29. It will be understood that in actual practice, a complete lubrication system might include additional well known elements and control devices, which have here been omitted. Such a system might also be arranged to furnish motive power for auxiliaries, such as a suitable type of movable nozzle assembly (not shown). For the purposes of disclosure of the present invention, however, the system may be considered as effecting distribution of oil to the engine bearings, by operation of the pump 27 to draw oil from the reservoir 26 by way of an inlet communication 30 and to discharge oil under pressure through a pipe 31 and through the cooler 28 to a manifold pipe 32 leading to bearings 22, 23 and 24. The scavenging pump 29 is at the same time operative with the oil pump 27 to draw excess oil from the bearings, by way of a scavenge pipe 25, the scavenged oil being returned through a discharge pipe 25a to the reservoir 26.

According to the invention, a check valve device 33 is interposed in the pipe 31 at the discharge side of the pump 27. The check valve device 33 comprises a casing having a chamber 34 containing a valve element 35, which is urged toward its seat by a coil spring 36 and is adapted to be unseated by pressure of oil normally discharged from the pump by way of a discharge communication 31a. A by-pass 37 having a choke or restricted orifice 38 of predetermined flow area is provided for maintaining a controlled bleed communication between the pump discharge communication 31a, at a point upstream with relation to the check valve device 33, and a scavenge zone such as the scavenge pipe 25.

In operation, with the apparatus in a normal or substantially horizontal position, as shown in the drawing, the oil pump inlet communication 30 is submerged under the level of oil contained in the reservoir 26, so that oil can be pumped therefrom through the check valve device 33 to the lubrication system in the usual manner. The restricted orifice 38, while permitting flow at a slow rate of oil of normal viscosity through the by-pass 37 to the scavenged communication 25, is so proportioned relative to the oil output capacity of the pump 27 as to render negligible the effect of such a restricted bleed of oil upon operation of the system as a whole.

On the other hand, the orifice 38 is large enough to pass a volume of air at a relatively rapid rate. Thus, if for any reason the apparatus is tilted to bring the level of oil to the position indicated at A, so that the inlet communication 30 of the pump 27 is uncovered, causing admission of air to the pump, substantially all of the air discharged by the pump will then be diverted back from the discharge communication 31a through the by-pass 37 to the scavenge communication 25, since with the by-pass always open, the oil pump cannot build up air pressure sufficient to effect unseating of the check valve 35.

From the foregoing it will be seen that the improvement arrangement of elements of the pressure lubrication system can readily be incorporated in aviation power plant equipment of current or advanced design without necessitating extensive modifications, and will effectively prevent access of air to the lubrication system during operation in an inclined position, while ensuring rapid repriming of the pump upon resumption of the normal or horizontal position of the apparatus.

While the invention has been shown in but one form, it will be obvious to those skilled in the art that it is not so limited, but is susceptible of various other changes and modifications without departing from the spirit thereof.

What is claimed is:

1. Means for preventing access of air to an oil pressure system including an oil pump for supplying oil thereto through a discharge communication and a scavenge pump for withdrawing excess oil from said system through a scavenge communication, said means comprising a spring-pressed check valve interposed in said discharge communication for normally passing oil under pressure delivered by said oil pump, and a restricted by-pass communicating with said discharge communication at a point anterior to said check valve and with said scavenge communication on the inlet side of said scavenge pump, said by-pass having a predetermined flow area substantially retarding flow of fluid having the viscosity of oil normally delivered by said oil pump, while venting air inadvertently discharged by said pump to prevent build-up of air pressure sufficient to open said check valve.

2. In an aviation power plant having a pressure lubrication system joined to a supply reservoir, an oil pump, the inlet of which is normally submerged in oil in the reservoir, for supplying oil to the system through a discharge communication, a scavenge pump for withdrawing oil from the system through a scavenge communication, said scavenge pump being in communication with the reservoir, means comprising a spring pressed check valve interposed in said discharge communication for normally passing oil under pressure delivered by said oil pump, and a restricted by-pass communicating with said discharge communication at a point anterior to said check valve and with said scavenge communication on the inlet side of said scavenge pump, said by-pass having a predetermined flow area substantially retarding flow of fluid having the viscosity of oil normally delivered by said oil pump, while bleeding air inadvertently discharged by said pump, said scavenge pump returning the oil and air from the restricted by-pass back to the supply reservoir.

3. The combination of claim 2 further defined in that the restricted by-pass is formed by a relatively large passage for the major portion of its length and said large passage has a short restricted portion joining two of said large portions.

IRVIN R. WHITEMAN.

REFERENCES CITED

The following references are of record in the file of this patent:

UNITED STATES PATENTS

| Number | Name | Date |
| --- | --- | --- |
| 2,456,886 | Mori | Dec. 21, 1948 |
| 2,503,016 | Weeks | Apr. 4, 1950 |

FOREIGN PATENTS

| Number | Country | Date |
| --- | --- | --- |
| 128,170 | Austria | May 10, 1932 |
| 880,952 | France | Jan. 11, 1943 |